UNITED STATES PATENT OFFICE.

WILHELM REISSIG, OF MUNICH, GERMANY.

MANUFACTURE OF ARTIFICIAL STONE.

SPECIFICATION forming part of Letters Patent No. 477,847, dated June 28, 1892.

Application filed January 26, 1892. Serial No. 419,353. (No specimens.) Patented in Luxemberg August 11, 1891, No. 1,490; in England August 14, 1891, No. 13,738; in Belgium August 31, 1891, No. 95,981, and in France December 2, 1891, No. 215,521.

*To all whom it may concern:*

Be it known that I, WILHELM REISSIG, a citizen of the Kingdom of Bavaria, residing at Munich, Bavaria, Germany, have invented certain new and useful Improvements in the Manufacture of Artificial Stone, (for which I have obtained patents in England, No. 13,738, dated August 14, 1891; in France, No. 215,521, dated December 2, 1891; in Belgium, No. 95,981, dated August 31, 1891, and in Luxemburg, No. 1,490, dated August 11, 1891,) of which the following is a specification.

In preparing imitations of terra-cotta I employ fragments of real terra-cotta and also common bricks, fire-bricks, clinkers, &c., in a powdered condition, so that any desired color may be obtained by mixing. This powder, which is ground coarse for large objects and finely for small figures, is mixed with burnt powdered gypsum and burnt slaked lime and water in the manner of mortar and is then pressed or stamped into the desired form or mold by mechanical pressure and finally taken out after hardening. The hardening may be promoted by the addition of burnt and powdered or crumbled (weathered) lime.

A mixture of silicate of lime (due to the well-known property of silicates, and hence, also, of the burnt earthenware to make lime hydraulic) with excess of hydrate of lime and a fraction of gypsum thus results. The latter, being soluble in water, is converted into sulphate of barium and caustic lime by immersing the completed article into barium-hydrate solution. The caustic lime thus formed, together with that already existing, combines with the carbonic acid of the air to form carbonate of lime, so that the final product is a mixture of silicate of aluminium, silicate of lime, sulphate of barium, and carbonate of lime. It is obvious that this chemical process is not injuriously affected by the addition of small quantities of suitable pigments, which may be added to secure the desired tint or shade. If desired, the conversion of caustic lime into carbonate of lime may also be accelerated and the hardening process hastened by supplying carbonic acid— *e. g.*, in the form of products of combustion or by immersing into an aqueous solution of bicarbonate of ammonia or potash. After having been completely dried the articles may be protected against the action of air and rain by liquid silex or a caseine solution of lime, (known as "stone-paint.")

Articles of a purely decorative character, relief and ornamental parts, or, briefly, such parts as are not to be subjected to pressure, and especially such as are used for interior decoration, may be produced without the exertion of mechanical pressure on the mold. In such cases the mold may hence consist of soft materials, such as wax, glue, gelatine, gutta-percha, &c. The process of production is the same as above set forth.

The proportions of weight of the ingredients may vary. If no stress is laid upon rapid drying, the powdered burnt lime may be entirely omitted and slaked lime substituted therefor. On an average the best results are obtained by the following proportions: one part of hydrate of lime, (caustic lime;) one part burnt gypsum; two parts powdered bricks, (fire-bricks, terra-cotta, &c.)

What I claim, and desire to secure by Letters Patent, is—

1. The process of producing artificial stone, which consists in mixing powdered earthenware with burnt slaked lime, burnt gypsum, and water, and then treating the mixture with a solution that will convert the gypsum into an insoluble compound, substantially as set forth.

2. The process of producing artificial stone, which consists in mixing powdered earthenware with burnt slaked lime, burnt gypsum, and water, then treating with a solution of barium hydrate to destroy the solubility of the gypsum, and finally subjecting the mixture to the action of carbonic acid.

3. The process of producing artificial stones, which consists in mixing powdered earthenware, such as bricks, terra-cotta, &c., with burnt slaked lime, burnt gypsum, and water, then suitably shaping the cement or mixture so formed, and then treating with a solution of barium hydrate to destroy the solubility of the gypsum.

4. The process of producing artificial stones, which consists in mixing powdered earthenware, such as brick, terra-cotta, &c., with burnt slaked lime, burnt gypsum, and water, adding powdered burnt lime, then suitably shaping the cement or mixture so formed, and then treating with a solution of barium hydrate to destroy the solubility of the gypsum.

5. A compound for artificial stones, &c., consisting of the combination of silicate of aluminium, silicate of lime, sulphate of barium, and carbonate of lime.

In testimony that I claim the foregoing as my invention I have signed my name in presence of two subscribing witnesses.

WILHELM REISSIG.

Witnesses:
F. W. CATLIN,
EMIL HENZEL.